United States Patent [19]

Shih et al.

[11] Patent Number: 4,489,192
[45] Date of Patent: Dec. 18, 1984

[54] CATIONIC VINYL ESTER BASED POLYMER LATICES, THEIR PREPARATION AND USE AS FORMALDEHYDE-FREE BINDERS

[75] Inventors: Yen-Jer Shih, Piscataway; Carmine P. Iovine, Bridgewater, both of N.J.

[73] Assignee: National Starch and Chemical Corporation, Bridgewater, N.J.

[21] Appl. No.: 539,038

[22] Filed: Oct. 5, 1983

[51] Int. Cl.³ .................. C08L 33/24; C08L 33/14
[52] U.S. Cl. .................... 524/813; 524/815; 526/292.2; 526/292.95; 526/220; 162/164.6; 428/265
[58] Field of Search .............. 524/813, 815; 526/292.2, 292.95; 162/164.6; 428/265

[56] References Cited

U.S. PATENT DOCUMENTS

| | | | |
|---|---|---|---|
| 3,095,390 | 6/1963 | Maeder | 260/17 |
| 3,287,305 | 11/1966 | Maeder | 260/29.6 |
| 3,678,098 | 7/1972 | Lewis et al. | 260/89.5 |
| 3,702,799 | 11/1972 | Lewis et al. | 162/168 |
| 4,165,419 | 8/1979 | Suzuki | 526/292.2 |
| 4,200,562 | 4/1980 | Yoshioka | 526/292.2 |
| 4,226,748 | 10/1980 | Matsunaga | 524/815 |
| 4,420,583 | 12/1983 | Hutton | 524/501 |

FOREIGN PATENT DOCUMENTS 55-98201  7/1980  Japan.
56-55412  5/1981  Japan.

*Primary Examiner*—C. Warren Ivy
*Attorney, Agent, or Firm*—Edwin Szala; Margaret B. Kelley

[57] ABSTRACT

High solids, low viscosity, alkaline-curable, thermosetting cationic vinyl ester based polymer latices, characterized by the high molecular weight of the polymer therein, are prepared by polymerizing at least 5% of selected vinyl esters (up to $C_6$), 0.5–10% of a self-cross-linking cationic quaternary ammonium monomer, and optionally a vinyl polymerizable monomer such as butyl acrylate, ethylene, acrylamide, diallyl maleate, and/or 2-hydroxyethyl acrylate. The polymerization is carried out in the presence of water, a watersoluble cationic azo initiator, a water-soluble amino thiol salt chain transfer agent, and a cationic and/or nonionic surfactant. The latices are useful as formaldehyde-free binders for polyester nonwovens.

20 Claims, No Drawings

CATIONIC VINYL ESTER BASED POLYMER LATICES, THEIR PREPARATION AND USE AS FORMALDEHYDE-FREE BINDERS

BACKGROUND OF THE INVENTION

This invention relates to self-crosslinking cationic vinyl ester based polymer latices, a process for their preparation, and their use as binders or coatings for formaldehyde-free end use areas.

The preparation of functional cationic monomers and the use thereof in alkaline-curing polymers are described in U.S. Pat. Nos. 3,678,098, 3,694,393, and 3,702,799 (issued July 18, Sept. 26, and Nov. 14, 1972 to Sheldon N. Lewis et al.) and U.S. Pat. Nos. 3,095,390 and 3,287,305 (issued June 25, 1963 and Nov. 22, 1966 to A. Maeder).

The cationic functional monomers of the Lewis et al. patents are monoethylenically unsaturated ester monomers derived from N,N-dialkylaminoalkyl esters of (meth)acrylic acid and epihalohydrins. They have the formula

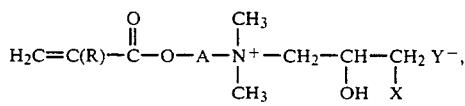

wherein R is hydrogen or methyl; A is $C_2$–$C_6$ alkylene group having at least two carbon atoms in a chain between the O and N atoms or A is a polyoxyalkylene group of the formula $(CH_2CH_2O)_xCH_2CH_2$ where x is at least 1; X is iodine, bromine, or chlorine; and Y is an anion. The polymers thereof are used as wet strength agents in paper and the acrylate copolymers thereof have been suggested for use in bonding nonwoven fabrics. The polymers are prepared using typical emulsion polymerization techniques including the use of conventional initiators or redox systems and nonionic or cationic emulsifiers (surfactants).

The monomers of the Maeder patents include monoethylenically unsaturated amide monomers derived from N,N-dialkylaminoalkyl amides of (meth)acrylic acid and epichlorohydrin. These monomers have the formula

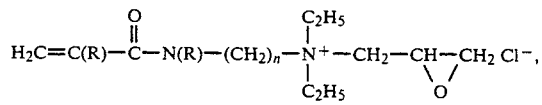

wherein R is hydrogen or a methyl group and n is 2 or 3. Cationic dispersions of finely divided water insoluble polymers thereof (e.g. polymers with styrene) are useful for coating and impregnating textiles, for example, for rendering them water repellant. Customary polymerization techniques are used including the use of organic or inorganic peroxides or persulfates as catalysts and the use of cationic or nonionic emulsifying agents.

The major problem associated with the polymerization of vinyl esters, such as vinyl acetate, with these cationic monomers is the retardation of polymerization and the resultant poor conversion. Anionic water-soluble peroxydisulfates cannot be used as initiators since coagulation of the cationic monomer and/or copolymer results. The use of water-soluble redox initiators gives either poor conversion or latices which are not alkaline-curable to crosslinked polymers.

In order to prepare vinyl ester based polymers at high conversion, a water-soluble azo initiator may be used. One such initiator is 2,2'-azobis(2-amidino-propane) hydrochloride which may be used either with cationic or nonionic surfactants. The conversion and end use performance of the resulting polymer latices is good but the bulk viscosity of the emulsion is usually too high. Because of the water solubility of the cationic functional monomer and vinyl acetate, a water-soluble polyelectrolyte is formed in the aqueous phase during the polymerization. This water-soluble polymer is partially responsible for the high latex viscosities (independent of particle size effects). Typically, chain transfer agents such as 2-mercaptoethanol are used to reduce the bulk viscosity. The use thereof does reduce the viscosity but, because of their solubility partition coefficient, the intrinsic viscosity of the polymer is also reduced [i.e. they function to control molecular weight by chain transfer in both the polymer phase (discontinuous) or the aqueous phase (continuous)].

There is therefore a need for a water-soluble initiator/chain transfer system for use in the emulsion polymerization of vinyl acetate and the above functional cationic monomers which results in good conversion and which provides an alkaline-curing polymer latex characterized by its low bulk viscosity and the high molecular weight of the polymer therein. On the performance side, for nonwoven diaper facings, the polyester webs treated with the self-crosslinking cationic polymer latices should have good wet, dry and hot tensile strength.

SUMMARY OF THE INVENTION

The present invention provides a high solids, low viscosity, alkaline-curable, thermosetting cationic vinyl ester based polymer latex, which is prepared by polymerizing a mixture of (a) at least about 5% of a vinyl ester having the formula

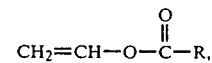

wherein R is a straight or branched chain $C_1$–$C_6$ alkyl group;

(b) about 0.1–10% of a self-crosslinking cationic quaternary ammonium monomer having the formula:

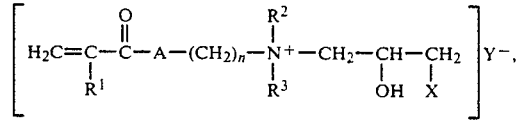

where $R^1$ is hydrogen or a methyl group; A is —O— or

with $R^4$ being hydrogen or a $C_1$–$C_3$ alkyl group; $R^2$ and $R^3$ are independently $C_1$–$C_6$ alkyl groups; X is a halogen; Y is an anion; and n is 1–4; and (c) 0–94.9% of a vinyl polymerizable monomer; the polymerization being carried out in the presence of water, an effective amount of a water-soluble cationic azo initiator and a water-soluble amino thiol salt chain transfer agent, and an emulsion-stabilizing amount of a cationic or nonionic surfactant or mixtures thereof; the monomer percentages being by weight and totaling 100%; the self-crosslinking cationic polymer having a higher molecular weight than the same polymer prepared by carrying out the polymerization in the presence of a chain transfer agent other than the water-soluble, substantially non-partitioning amino thiol salt chain transfer agent. The resulting latices have a Brookfield viscosity of about 1200 cps. or less at about 38–50% by weight of solids. The polymers typically have an intrinsic viscosity of at least about 1 dl./g. measured in dimethyl formamide.

DESCRIPTION OF THE PREFERRED EMBODIMENTS

The vinyl esters suitable for use herein includes preferably vinyl acetate and other vinyl esters of saturated aliphatic monocarboxylic acids containing up to 6 carbon atoms, such as vinyl propionate and the like. The monomer(s) are used in amounts from about 15–99.9%, preferably 10–97%, and most preferably 40–85% by weight.

The functional cationic monomers suitable for use herein are quaternary ammonium compounds prepared by reacting an epihalohydrin with a suitable amine. They are represented by the formula given above. Typically the anion is $Cl^-$, $Br^-$, $RCO_2^-$, $NO_3^-$, $SO_4^{--}$, or like anions derived from inorganic or organic acids.

The ester monomer may be prepared according to the procedure described in U.S. Pat. No. 3,678,098 (cited earlier), the disclosure of which is incorporated herein by reference. An epihalohydrin, preferably epichlorohydrin, is reacted under acid conditions with the hydrogen acid salt of a basic ester of the formula

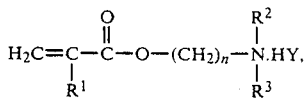

wherein $R^1$, $R^2$, $R^3$, Y and n, are as defined hereinabove. The reaction is carried out at from ambient temperature to 80° C., preferably 50° C. or less, in an aqueous medium. The epihalohydrin, used in at least a stoichiometric amount, is generally added to the aqueous salt solution. It is essential to maintain the pH on the acid side to avoid side reactions. A polymerization inhibitor (e.g. monomethyl ether of hydroquinone, hydroquinone, or phenothiazine) may be used. The monomers are obtained in high yield in the aqueous reaction medium. They may be stored as the aqueous solution or concentrated or even isolated by vacuum vaporization of the water.

The cationic side monomer may be prepared according to the procedure of U.S. Pat. No. 3,095,390 (cited earlier), the disclosure of which is incorporated herein by reference. They may be prepared using the above procedure except that the hydrogen acid salt of a suitable basic amide is used. The salt will have the formula

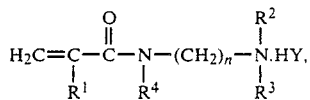

wherein $R^1$, $R^2$, $R^3$, $R^4$, Y and n are as defined above.

Optional comonomers suitable for use with the above vinyl ester and functional cationic monomers include vinyl polymerizable monomers such as esters of (meth)acrylic acid with $C_1$–$C_{18}$ alcohols, including $C_1$–$C_{18}$ alkanols, benzyl alcohol, cyclohexyl alcohol, and isobornyl alcohol, such as methyl, ethyl, butyl, 2-ethylhexyl, or octadecylacrylate or methacrylate; (meth)acrylamide and their N-substituted derivatives, such as N-mono and N-dimethyl, -ethyl, -propyl, and -butyl acrylamide or methacrylamide and N-mono- or diphenylacrylamide; vinyl ethers such as butyl vinyl ether; N-vinyl lactams such as N-vinyl pyrrolidinone; halogenated vinyl compounds such as vinyl chloride and vinylidene chloride or flouride; alkyl vinyl ketones such as methyl or ethyl vinyl ketone; diesters such as dimethyl, diethyl, dipropyl, dibutyl, diphenyl, dibenzyl, and di(phenylethyl) itaconate, maleate, and fumarate; (meth)allyl ester of saturated aliphatic monocarboxylic acids, such as allyl and methallyl acetates, propionates, and valerates; vinyl compounds such as vinyl pyrrole; and olefins such as ethylene. The comonomers may be used in amounts up to 94.9% by weight. The preferred comonomers are butyl acrylate in amounts up to about 90%, preferably about 40–60%; ethylene in amounts up to about 35%, preferably 15–25%; acrylamide in amounts up to about 5%, preferably 0.5–1%; 2-hydroxyethyl acrylate in amounts up to about 10%, preferably 1–2%. Minor amounts (e.g. 0.01–2%) of crosslinking monomers such as diallyl maleate and triallyl cyanurate are also useful herein.

Suitable initiators include water-soluble azo initiators such as 2,2'-azobis(2-amidino-propane) hydrochloride and azo-N,N'-dimethylene isobutyramidine hydrochloride. Typically they are used in amounts of about 0.05–1% by weight based on the monomer, preferably in amounts of about 0.18–0.4%.

Suitable chain transfer agents include water-soluble amino thiol salts such as cysteamine hydrochloride (also referred to as aminoethane thiol hydrochloride) and 2-diethylaminoethane thiol hydrochloride. Typically they are used in amounts of about 0.001–0.2% by weight based on monomer, preferably about 0.002–0.12%.

The cationic and ionic surfactants useful herein are conventional and disclosed in U.S. Pat. No. 3,287,305 (cited previously). Typically, they are used in amounts of 0.5–6% by weight based on monomer. Suitable cationic surfactants include a compound of a higher fatty amine with an acid selected from the group consisting of acetic acid, hydrochloric acid and sulfuric acid; a salt of diethylaminoethyl ester of a higher fatty acid; oleyl amido ethyl-diethylamine acetate; and a quaternary ammonium compound such as cetyl-dimethyl-benzyl-ammonium chloride, cetyl-trimethyl-ammonium bromide, para(trimethylammonium)benzoic acid cetyl ester methosulphate, [δ-(lauroylamino)propyl]-trimethyl-ammonium methosulfate, cetyl-pyridinium methosulphate, octadecyltrimethyl-ammonium bromide, and the quaternary ammonium compound from diethyl sulphate and triethanolamine tristearate. Suitable nonionic surfactants include polyglycol ethers of a fatty acid, fatty amine, or fatty alcohol, octylphenol polyglycol ether, and polyhydric alcohol partially esterified with a higher fatty acid.

The following examples will more fully illustrate the embodiments herein. In the examples all parts are given by weight and all temperatures are in degrees Celsius unless otherwise noted. Brookfield viscosities (20 RPM) are measured at the indicated latex solids, and intrinsic viscosities (I.V.) are determined in dimethyl formamide at 30° C. Deionized water was used in the preparation of the solutions and emulsions used for the polymerizations.

EXAMPLE 1

This example describes the preparation of a typical high solids, low viscosity polymer latex containing a high molecular weight cationic polymer prepared from vinyl acetate (VA) and butyl acrylate (BA) and the water-soluble self-crosslinking cationic amide monomer described below. The polymerization was carried out in the presence of 2,2'-azobis(2-amidinopropane)hydrochloride (AAP) as the initiator, cysteamine hydrochloride (CTA) as the chain transfer agent, and cetyltrimethylammonium chloride (CTMAC) as the surfactant.

Part A—Preparation of The Cationic Monomer

A 12-1. reactor equipped with a thermometer, agitator, addition funnel, and condenser was charged with 2968 g. water and 3060 g. N,N-dimethylaminopropyl methacrylamide (DMAPMA). The solution was cooled to 20° C. and 1820 g. of concentrated hydrochloric acid were added slowly over 2 hr. while maintaining the temperature below 30° C. Then 1332 g. epichlorohydrin (EPI) were added slowly over 2.5 hr. while maintaining the temperature at 30°–35° C. The solution was held overnight and then adjusted to pH 4–4.5 with hydrochloric acid. The unreacted EPI was removed by vacuum stripping at 63°–68° C. and the distillate was replaced with the same amount of water during stripping.

The resulting solution (53.67% solids) contained the quaternary ammonium salt which is the adduct of DMAPMA and EPI and which is referred to as DPE. The salt has the following formula:

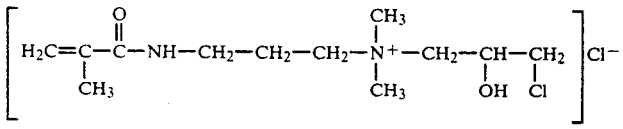

Part B—Preparation of the Polymer Latex

A 2-liter four neck flask was fitted with a thermometer, condenser, agitator, subsurface nitrogen purge, and suitable addition funnels. The following charges were prepared:
- A—0.25 g. CTMAC, 1.5 g. 70% octylphenol with 30 moles ethylene oxide (EO), and 0.1 g. AAP in 380 g. water
- B—50 g. vinyl acetate (VA) and 5 g. butylacrylate (BA)
- C—200 g. VA and 245 g. BA emulsified in a mixture of 100 g. water, 15.4 g. of the above octylphenol, 4 g. 100% octylphenol with 4 moles EO; 0.22 g. CTA, and 25.7 g. monomer solution of Part A
- D—0.8 g. AAP in 41 g. water
- E—0.1 g. AAP in 5 g. water The initial charge A was added to the flask and the mixture was purged subsurface with nitrogen for 30 min. Agitation was started and the monomer mixture B was added. The mixture was heated to 75° C. and, 5 min. after reflux stopped, charges C and D were added separately and slowly over 4.5 hr. at 75° C. The mixture was maintained at 75° C. for 10 min. after the additions were completed. Then additional initiator solution E was added over 10 min. The batch was then held for 1 hr. at 75° C., cooled, and discharged.

The resulting latex (47.4% solids) had a Brookfield viscosity of 257 cps. Conversion was 95.9%. The intrinsic viscosity of the VA/BA/DPE polymer [48.7/48.7/2.6] was 1.5 dl./g.

EXAMPLES 2–4

This example describes the preparation of other high solids, low viscosity polymer latices containing high molecular weight functional cationic polymers of VA/BA/DPE (48.6/48.6/2.8). The polymerization was carried out in the presence of a mixture of cationic and nonionic surfactants using the initiator (AAP) and chain transfer agent (CTA) of Example 1.

The polymerization was carried out as before except for the following changes in charges A, C, and E and the additional charge F:
- A—1 g. lauryl alcohol with 23 moles EO was used instead of 1.5 g. 70% octylphenol with 30 moles EO
- C—6.75 g. CTMAC and 5.5 g. of the above lauryl alcohol were used in place of the octylphenols; 0.145 g. CTA and 26.4 g. monomer solution were used instead of 0.22 g. and 25.7 g; and 0.08 sodium chloride was added.
- E—0.7 g. t-butyl hydroperoxide (70%) in 7 g. water were used in place of 0.1 g. AAP in 5 g. water.
- F—0.7 g. sodium formaldehyde sulfoxylate in 7 g. water The conditions were the same except that the temperature was 65° C. instead of 75° C. and E was added in one shot rather than over a 10 min. period. After the addition of E was complete, F was added over 5 min. The latex (L-2) was held for 10 min., cooled, and discharged.

Using the above procedure, polymer latices were prepared using additional amounts of the chain transfer agent CTA (0.22 and 0.58 g.). The intrinsic and bulk (Brookfield) viscosities of the latices are given below.

| Latex | Chain Transfer Agent (ppm) | Conversion (%) | Solids Content (%) | Intrinsic Viscosity (dl./g.) | Brookfield Viscosity (cps.) |
|---|---|---|---|---|---|
| L-2 | 290 | 97.8 | 47.5 | 1.75 | 684 |
| L-3 | 440 | 98.5 | 47.4 | 1.97 | 336 |
| L-4 | 1160 | 95.9 | 46.6 | 1.95 | 59 |

The results show that the use of increasing amounts of the water soluble chain transfer agent significantly reduced the bulk viscosity of the latex without reducing the polymer molecular weight.

EXAMPLE 5

This example shows the use of a self-crosslinking cationic ester monomer to prepare a high solids, low viscosity latex containing a high molecular weight polymer.

Part A—Preparation of The Cationic Monomer

A 4-neck, 1-l. flask equipped with a thermometer, agitator, addition funnel, and condenser was charged with 219 g. water and 108 g. concentrated hydrochloric acid. The solution was cooled to 10° C. and 169 g. N,N-dimethylaminoethyl methacrylate (DMAEMA) was slowly added over 2 hr. at such a rate that the contents were maintained at less than 15° C. Then 70 g. epichlorohydrin (EPI) were added in one shot. The solution was held overnight with stirring and then adjusted to pH 3.5 with hydrochloric acid. The unreacted EPI was removed by vacuum stripping at about 60° C.

The resulting solution (72.2% solids) contained the quaternary ammonium salt which is the adduct of DMAEMA and EPI and which is referred to as DEE. The salt has the following formula:

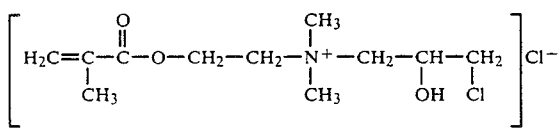

Part B—Preparation of The Polymer Latex

The polymerization was carried out as in Example 2 except that 10 g. of the above monomer solution were used in C instead of 26.4 g. of the monomer solution containing DPE and E and F were not used.

The resulting latex (48.1% solids) had a Brookfield viscosity of 350 cps. Conversion was 97.4%. The cationic polymer of VA/BA/DEE (49.3/49.3/1.4) had an intrinsic viscosity was 1.33.

EXAMPLE 6

This example shows the use of 2-diethylaminoethane thiol hydrochloride as the water-soluble chain transfer agent. The polymerization was carried out as in Example 2 except that 0.3 g. of the above chain transfer agent was used in A. The resulting latex (47.5% solids) had a Brookfield viscosity of 520 cps. Conversion was 96.7%. The intrinsic viscosity was 1.4 dl./g.

EXAMPLES 7-10 (comparative)

This example shows the viscosity differences in VA/BA/DPE (48.6/48.6/2.8) polymer latices prepared using a typical water soluble chain transfer agent that partitions (i.e. is soluble both in water and monomer). The polymerization was carried out as in Example 2 except that mercaptoethanol was used as the chain transfer agent in amounts of 0.02, 0.3, 0.4, and 0.6 g. The intrinsic and bulk viscosities are given below.

| Emulsion | Chain Transfer Agent (ppm) | Conversion (%) | Solids Content (%) | Intrinsic Viscosity (dl./g.) | Brookfield Viscosity (cps.) |
|---|---|---|---|---|---|
| 7* | 40 | 97.7 | 47.9 | 1.60 | 4150 |
| 8 | 600 | 97.0 | 46.6 | 1.12 | 278 |
| 9 | 800 | 97.1 | 47.0 | 0.90 | 150 |
| 10 | 1200 | 97.1 | 46.8 | 0.76 | 51 |

*0.5 g. lauryl alcohol (23 moles EO) was used instead of 1.0 g.

The results show that the use of the water soluble chain transfer agent that partitions reduced the bulk viscosity but also significantly reduced the molecular weight of the polymer. In comparison, the water soluble chain transfer agent of Example 4, when used in a comparable amount to that of Example 10 (1160 ppm vs. 1200 ppm), provided a polymer latex of low bulk viscosity (59 vs. 51 cps.) but did not reduce the polymer's molecular weight (I.V. of 1.95 vs. 0.76).

EXAMPLE 11 (comparative)

This example demonstrates that initiators other than the water-soluble azo initiator AAP do not provide satisfactory cationic polymer latices. The polymerization was carried out as before except that peroxide and anionic initiator systems were used.

Part A—Peroxide Initiated Polymerization

The following charges were made up:

A—5 g. 70% octylphenol with 30 moles EO, 0.3 g. octylphenol with 9-10 moles EO, 8 g. cationic monomer solution of Example 1, 2 g. 1% FeSO$_4$.7 H$_2$O, and 4 drops glacial acetic acid in 380 g. water.

B—50 g. VA, 5 g. BA, and 0.3 g. t-butyl hydroperoxide

C—0.3 g. sodium metabisulfite in 10 g. water

D—200 g. VA, 245 g. BA, and 1.2 g. t-butyl hydroperoxide emulsified in 100 g. water, 0.5 g. CTMAC, 21.5 g. of the above octylphenol (30 moles EO), 25 g. of the above octylphenol (9-10 moles EO); 19 g. DPE, and 1.5 g. sodium acetate E—1.2 g. sodium metabisulfite in 45 g. water F—0.7 g. t-butyl hydroperoxide in 5 g. water G—0.7 g. sodium metabisulfite in 10 g. water The polymerization was carried out as in Example 1 except that the initial charge A was purged with nitrogen for 1 hr. instead of 30 min. before the addition of B. C was added at 40° C. and the temperature brought up to 60°-65° C. D and E were slowly and separately added over 4.5 hr. Ten min. after the addition was completed, F was added in one shot. Then 5 min. later G was added over 5 min. The mixture was held for 10 min., cooled and discharged.

The resulting latex contained 46.9% solids. Conversion was 89.0%. The VA/BA/DPE (48.6/48.6/2.8) polymer had intrinsic and Brookfield viscosities of 1.62 dl./g. and 59 cps. However, even though the polymer latex was low in bulk viscosity and the polymer was high in molecular weight, it was not alkaline-curable as evidenced by the low film insolubles obtained (0.4%) after being catalyzed with 1.5% sodium sesquicarbonate.

A similar latex prepared without sodium acetate (46.1% solids and 96.5% conversion) was likewise not alkaline-curable having only 5.9% film insolubles after the addition of the catalyst.

In comparison, a latex similar to that of Example 1 was alkaline curable (41% film insolubles formed after catalysis). The latex was prepared in the same manner as that of Example 1 except that charge A contained no CTMAC and contained 5 g. instead of 1.5 g. of the 70% octylphenol (30 moles EO) and charge C contained 25 g. instead of 15.4 g. of the 70% octylphenol (30 moles EO). The resulting latex (46.9% solids) had a Brookfield viscosity of 268 cps. Conversion was 95%. The intrinsic viscosity was 1.47 dl./g.

Part B—Anionic Initiated Polymerization

The following charges were made up:
A—4.3 g. 70% octylphenol with 30 moles EO and 0.7 g. potassium persulfate in 380 g. water
B—50 g. VA and 5 g. BA
C—200 g. VA and 245 g. BA emulsified in 100 g. water, 31.4 g. octylphenol with 30 moles EO, 0.08 g. NaCl, and 10 g. cationic monomer solution of Example 1.
D—2.1 g. potassium persulfate in 45 g. water.

The polymerization was carried out as in Example 1. The latex coagulated during the slow addition of C and D.

EXAMPLES 12-23

This example describes the preparation of low viscosity polymer latices containing high molecular weight polymers of the cationic monomer of Example I (DPE) with vinyl acetate and other monomers including vinyl propionate (VP), butyl acrylate (BA), ethylene (E), acrylamide (ACM), diallyl maleate (DAM), and 2-hydroxyethyl acrylate (HEA). The polymers in Table I were prepared using the procedure of Example 2. The polymerization procedures used for the preparation of the vinyl acetate/ethylene polymer latices is described in the footnotes of Table II. The properties of the resultant latices and the composition of the various charges used in their preparation are summarized in the Tables. The monomer percentages for the vinyl acetate/ethylene polymers are calculations based on the Tg of the polymer, whereas those for the other vinyl acetate polymers are based on the amount of monomer charged.

TABLE I

| Ex. | Monomers | Solids (%) | Conv. (%) | I.V. (dl./g.) | V. (cps.) | Solution Contents |
|-----|----------|------------|-----------|---------------|-----------|-------------------|
| | Polymer Latices | | | | | |
| 12 | VA/DPE (97.2/2.8) | 47.1 | 95.9 | 1.70 | 140 | A - 0.3 g. CTMAC, 3 g. 70% octylphenol with 30 moles EO, 0.3 g. octylphenol with 9-10 moles EO, 8 g. cationic monomer solution of Example 1, and 0.5 g. AAP in 380 g. water<br>B - 55 g. VA<br>C - 445 g. VA emulsified in a mixture of 100 g. water, 8.5 g. CTMAC, 11.3 g. 70% octylphenol with 30 moles EO, 19 g. cationic monomer solution of Example 1, and 0.22 g. CTA<br>D - 1.5 g. AAP in 46 g. water |
| 13 | VA/BA/DPE (9.7/87.5/2.8) | 47.3 | 96.3 | 1.20 | 1052 | A and D - same as in Example 12<br>B - 50 g. VA and 5 g. BA<br>C - same as above except that 445.0 g. of BA were used in place of VA |
| 14 | VA/BA/ACM/DPE (48.4/48.4/0.5/2.7) | 48.1 | 97.0 | 1.44 | 104 | A - 0.1 g. CTMAC, 2.5 g. 70% octylphenol with 30 moles EO, and 0.1 g. AAP in 380 g. water<br>B - 50 g. VA and 5 g. BA<br>C - 200 g. VA and 245 g. BA emulsified in a mixture of 100 g. water, 25 g. 70% octylphenol with 30 moles EO, 0.22 g. CTA, 25.7 g. cationic monomer solution of Example 1, and 2.5 g. ACM<br>D - 0.8 g. AAP in 40 g. water<br>E - 0.1 g. AAP in 5 g. water |
| | Polymer Emulsion | | | | | |
| 15 | VA/VP/BA/DPE (9.8/38.9/48.5/2.8) | 44.3 | 90.4 | 1.2 | 532 | A - 0.3 g. CTMAC, 3 g. octylphenol with 30 moles EO, 0.3 g. octylphenol with 910 moles EO, 8 g. cationic monomer solution of Example 1, and 0.5 g. AAP in 380 g. water.<br>B - 50 g. VA and 5 g. BA<br>C - 245 g. BA and 200 g. VP emulsified in a mixture of 100 g. water, 8.5 g. CTMAC, 11.3 g. 70% octylphenol with 30 moles EO, 19 g. cationic monomer solution of Example 1, and 0.22 g. CTA<br>D - 1.5 g. AAP in 46 g. water |
| 16 | VA/BA/DPE (86.5/5.5/8.0) | 47.3 | 95.5 | 1.6 | 170 | A, B, and D - same as in Example 2<br>C - same as in Example 2 except that 0.22 g. of CTA and 81 g. cationic monomer solution of Example 1 were used. After the slow addition, the mixture was held 30 min. at 80° C. and the batch was held for 5 hr. at 80° C. before cooling and discharge. |
| 17 | VA/BA/DAM/DPE (47.86/47.86/0.05/4.23) | 47.3 | 95.6 | partially gelled | 1110 | A - 0.3 g. CTMAC, 3.0 g. 70% octylphenol with 30 moles EO, 0.3 g. octylphenol with 9-10 moles EO, 8 g. cationic monomer solution of Example 1, 0.5 g. AAP in 385 g. water.<br>B - same as in Example I.<br>C - 200 g. VA and 245 g. BA emulsified in a mixture of 100 g. water, 0.5 g. CTMAC, 21.5 g. 70% octylphenol with 30 moles EO, 31 g. cationic monomer solution of Example 1, and 0.22 g. CTA.<br>D - 1.5 g. AAP in 46 g. water. |

TABLE II

| Ex. | Monomers | Polymer Emulsion Solids (%) | Conv. (%) | I.V (dl./g.) | V. (cps.) | Solution Contents |
|---|---|---|---|---|---|---|
| 18[a] | VA/E/DPE (15.9/81.5/2.6) Tg 2° C. | 47.4 | 95.2 | 1.10 | 203 | A - 0.05 g. CTMAC, 1.25 g. 70% octylphenol with 30 moles EO, 0.05 g. AAP in 190 g. water<br>B - 187.5 g. VA emulsified in a mixture of 50 g. water, 18.8 g. 70% octylphenol with 30 moles EO, 0.11 g. CTA. and 12.8 g. cationic monomer solution of Example 1.<br>C - 22 ml. of 0.02 g./ml. aqueous solution of AAP |
| 19[b] | VA/E/DAM/DPE (78.8/13.5/ 0.04/2.66) Tg −2° C. | 41.8 | 95.6 | partially gelled | 70 | A - 0.12 g. CTMAC, 1.5 g 70% octylphenol with 30 moles EO, 0.15 g. octylphenol with 9-10 moles EO, 4 g. cationic monomer solution of Example 1, and 0.25 g. AAP in 190 g. water.<br>B - 187.5 g. VA and 0.125 DAM emulsified in a mixture of 50 g. water, 0.25 g. CTMAC, 11 g. 70% octylphenol with 30 moles EO, 1.25 g. octylphenol with 9-10 moles EO, 0.11 g. CTA, and 9.5 g. cationic monomer solution of Example 1.<br>C - 87.5 ml. of 1% aqueous solution of AAP. |
| 20[b] | VA/E/HEA/DPE (80.6/14.9/ 1.9/2.6) Tg 3° C. | 41.1 | 93.0 | 1.1 | 125 | A - 0.33 g. CTMAC, 1.5 g. 70% octylphenol with 30 moles EO, 0.15 g. octylphenol with 9-10 moles EO, 3.3 g. of cationic monomer solution of Example 1, and 0.08 g. AAP in water.<br>B - 187.5 g. VA and 5 g. HEA emulsified in a mixture of 50 g. water, 10.15 g. CTMAC, 1.25 g. 70% octylphenol with 30 moles EO, 0.11 g. CTA, and 9.5 g. cationic monomer solution of Example 1.<br>C - same as in Example 19. |
| 21[b] | VA/E/DPE (75.8/18.9/5.3) Tg −1.8° C. | 38.9 | 89.5 | 1.24 | 80 | A - same as in Example 20.<br>B - same as in Example 20 except that no HEA was used and the amounts of VA and cationic monomer solution of Example 1 used were 175 g. and 22.5 g., respectively.<br>C - same as in Example 19. |
| 22[c] | VA/E/DPE (24.8/72.8/2.4) Tg −12.6° C. | 40.8 | 88.0 | 0.9 | 35 | A - same as in Example 20.<br>B - same as in Example 20 except that no HEA was used and the amounts of VA and cationic monomer solution of Example 1 used were 170 g. and 9.5 g., respectively.<br>C - same as in Example 19. |
| 23[b] | VA/E/DPE (75.7/21.7/2.6) Tg −7.6° C. | 39.6 | 88.6 | 1.27 | 110 | A - same as in Example 20.<br>B - same as in Example 21 except that 9.5 g. cationic monomer solution of Example 1 were used. |

[a] The polymerization was carried out by charging a 1-liter stainless steel reactor with A, applying a vacuum, and purging with nitrogen three times. Then 25.0 g. vinyl acetate were charged and the temperature was brought up to 75° C. The reactor was pressurized with ethylene to 350 psi and, 30 min. after initiation, the ethylene pressure was raised to 550 psi. while B and C were slowly and separately pumped in over 5 hrs. The mixture was held at 75° C. for 2 hr., cooled and discharged.
[b] The polymerization was carried out as in Example 18 except that B and C were pumped in over 5 hr. and 5.5 hr., respectively, and the mixture was held at 75° C. for only 30 min.
[c] The polymerization was carried out as in Examples 19-21 except that the reactor was pressurized with 800 psi of ethylene instead of 550 psi.

EXAMPLE 24

This example demonstrates that the polymers are alkaline curable.

The latices of Examples 21 and 23 were catalyzed with 1.5% and 1.05% of sodium sesquicarbonate. Films were cast, dried in an oven at 60° C. for 1 hr., and then baked at 130° C. for 5 min. The percentage insolubles in dimethyl formamide was 33% and 47%, respectively, compared with only 3.3% and 1.3% for films cast from non-catalyzed latices.

EXAMPLE 25

This example shows the use of the cationic polymer latices as binders for polyester nonwovens.

The latices of Examples 1 and 2 were blended with 1.5 part sodium sesquicarbonate and 0.5 part octylphenol with 9-10 moles EO, diluted to 25% solids with deionized water, and used to saturate a polyester web. After drum drying the webs had wet strengths of 0.99 and 1.03 and dry strengths of 1.69 and 1.62 lb./in., respectively.

A similar latex containing a VA/BA/DPE cationic polymer was blended as above and used to saturate a polyester web. The dried web had wet and dry strengths of 1.13 and 1.83 lb./in. The polymerization was carried out as in Example 1 except that C consisted of 250 g. VA and 195 g. BA. The resulting latex (47.3% solids) had a Brookfield viscosity of 184 cps.

EXAMPLE 26

This example shows the use of a cationic polymer latex as a strength additive for paper.

The latex was prepared using the procedure of Example 1. The solutions prepared were as follows:

A—0.25 g. CTMAC, 2 g. 70% octylphenol with 30 mole EO, 0.3 g. octylphenol with 9-10 moles EO, 8 g. cationic monomer solution of Example 1, and 0.5 g. AAP in 380 g. water.

B—50 g. VA and 5 g. BA

C—350 g. VA, 95 g. BA, and 0.25 g. DAM emulsified in a mixture 100 g. water, 0.5 g. CTMAC, 21.5 g. 70% octylphenol with 30 moles EO, 2.5 g. octylphenol with 9-10 moles EO, 19 g. cationic monomer solution of Example 1, 0.22 g. CTA, and 1.5 g. sodium acetate D—1.5 g. AAP in 46 g. water The resulting latex (47.9% solids) which had a Brookfield viscosity of 414 cps., was blended with 2% sodium carbonate and 1% didecyldimethylammonium chloride and diluted to 10% solids with deionized water. A Whatman filter paper was saturated with the emulsion, dried overnight, and then oven cured for 1 min. at 160° C. (320° F.). The resulting pulp had wet and dry strengths of 6.4 and 20.3 lb./in.

Summarizing, this invention provides a process for preparing high solids, low viscosity $C_1$-$C_6$ vinyl ester based cationic polymer latices characterized by the high molecular weight of the self-crosslinking polymer therein.

Now that the preferred embodiments of the present invention are described in detail, various modifications and improvements thereon will become readily apparent to those skilled in the art. Accordingly, the spirit and scope of the invention are to be limited only by the appended claims, and not by foregoing specifications.

What is claimed is:

1. A high solids, low viscosity, alkaline-curable, thermosetting cationic vinyl ester based polymer latex, which is prepared by polymerizing a mixture of
  (a) at least about 5% of a vinyl ester having the formula

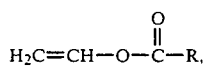

wherein R is a straight or branched chain $C_1$-$C_6$ alkyl group;
  (b) about 0.1–10% of a functional cationic quaternary ammonium monomer having the formula

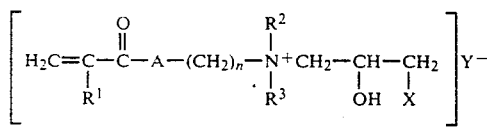

where $R^1$ is hydrogen or a methyl group; A is —O— or

with $R^4$ being hydrogen or a $C_1$-$C_3$ alkyl group; $R^2$ and $R^3$ are independently $C_1$-$C_6$ alkyl groups; X is a halogen, Y is an anion; and n is 1–4; and
  (c) 0–94.9% of a vinyl polymerizable monomer; the polymerization being carried out in the presence of water, an effective amount of a water-soluble cationic azo initiator and a water-soluble, substantially non-partitioning amino thiol salt chain transfer agent, and an emulsion-stabilizing amount of a cationic or nonionic surfactant or mixtures thereof; the monomer percentages being by weight and totaling 100%; the self-crosslinking cationic polymer having a higher molecular weight than the same polymer prepared by carrying out the polymerization in the presence of a chain transfer agent other than the water-soluble, substantially non-partitioning amino thiol salt chain transfer agent.

2. The latex of claim 1, wherein the Brookfield viscosity is about 1200 cps. or less at about 38–50% by weight of solids and wherein the polymer has an intrinsic viscosity of at least about 1 dl./g. measured in dimethyl formamide.

3. The latex of claim 1, wherein the cationic monomer has the formula

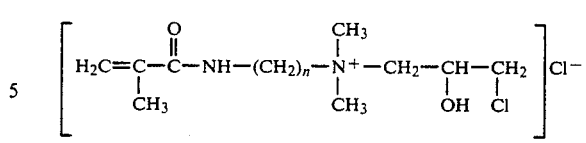

or

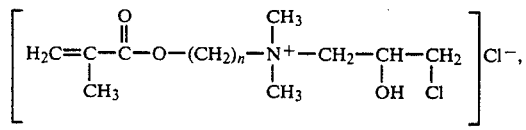

where n=2 or 3.

4. The latex of claim 1, wherein the vinyl ester is vinyl acetate or vinyl propionate; wherein the cationic monomer is the reaction product of N,N-dimethylaminopropyl methacrylamide and epichlorohydrin or of N,N-dimethylaminoethyl methacrylate and epichlorohydrin; and wherein the vinyl polymerizable monomer is butyl acrylate, ethylene, acrylamide, diallyl maleate, 2-hydroxyethyl acrylate, or mixtures thereof.

5. The latex of claim 4, wherein the vinyl ester is vinyl acetate present in an amount from about 92–99.5%.

6. The latex of claim 4, wherein the vinyl ester is vinyl acetate present in an amount from about 10–87%; wherein the cationic monomer is present in an amount from about 1–8%; and wherein the vinyl polymerizable monomer is butyl acrylate present in an amount from about 5–88%.

7. The latex of claim 6, wherein the vinyl polymerizable monomer further comprises about 0.5% acrylamide or about 0.05% diallyl maleate.

8. The latex of claim 4, wherein the vinyl ester is vinyl acetate present in an amount from about 75–85%; wherein the cationic monomer is present in an amount from about 2–6%; and wherein the vinyl polymerizable monomer is ethylene present in an amount from about 15–25%.

9. The latex of claim 8, wherein the vinyl polymerizable monomer further comprises about 0.05% diallyl maleate or about 1–6% 2-hydroxyethyl acrylate.

10. The latex of claim 4, wherein the vinyl ester is vinyl acetate present in an amount from about 97–98% and wherein the cationic monomer is the reaction product of N,N-dimethylaminopropyl methacrylamide and epichlorohydrin present in an amount from about 2–3%; characterized in that the latex has a viscosity of about 140 cps. at about 47% solids and the polymer has an intrinsic viscosity of about 1.7.

11. The latex of claim 4, wherein the vinyl ester is vinyl acetate present in an amount from about 9–10% and vinyl propionate present in an amount from about 38–39%; wherein the cationic monomer is the reaction product of N,N-dimethylaminopropyl methacrylamide and epichlorohydrin present in an amount from about 2–3%; and wherein the vinyl polymerizable monomer is butyl acrylate present in an amount from about 48–49%; characterized in that the latex has a viscosity of about 530 cps. at 44% solids and the polymer has an intrinsic viscosity of about 1.2.

12. The latex of claim 4, wherein the vinyl ester is vinyl acetate present in an amount from about 9–87%; wherein the cationic monomer is the reaction product of N,N-dimethylaminopropyl methacrylamide and epichlorohydrin present in an amount from about 1–8%; and wherein the vinyl polymerizable monomer is butyl acrylate present in an amount from about 5–88%; characterized in that the latex has a viscosity of about 60–1055 cps. at 47–48% solids and the polymer has an intrinsic viscosity of about 1.2–2.

13. The latex of claim 4, wherein the vinyl ester is vinyl acetate present in an amount from about 49–50%; wherein the cationic monomer is the reaction product of N,N-dimethylaminoethyl methacrylate and epichlorohydrin present in an amount from about 1–2%; and wherein the vinyl polymerizable monomer is butyl acrylate present in an amount from about 49–50%; characterized in that the latex has a viscosity of about 350 cps. at 48% solids and the polymer has a intrinsic viscosity of about 1.3.

14. The latex of claim 4, wherein the vinyl ester is vinyl acetate present in an amount from about 75–83%; wherein the cationic monomer is the reaction product of N,N-dimethylaminopropyl methacrylamide and epichlorohydrin present in an amount from about 2–6%; and wherein the vinyl polymerizable monomer is ethylene present in an amount from about 14–25%; characterized in that the latex has a viscosity of about 35–205 cps. at 39–47% solids and the polymer has an intrinsic viscosity of about 1.1–1.3 and a Tg of about $-1.8°$ C. to $-12.6°$ C.

15. A process for the preparation of an alkaline-curable, thermosetting vinyl ester based polymer latex, which comprises the step of polymerizing a mixture of at least 5% of a vinyl ester, about 0.1–10% of a self-crosslinking cationic quaternary ammonium monomer, and 0–94.9% of a vinyl polymerizable monomer in the presence of water and an effective amount of an initiator and a chain transfer agent and an emulsion-stabilizing amount of a cationic or nonionic surfactant or mixtures thereof; the monomer percentages being by weight and totaling 100%; the vinyl ester having the formula

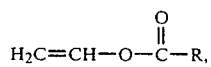

wherein R is a straight or branched chain $C_1$–$C_6$ alkyl group and the cationic compound having the formula

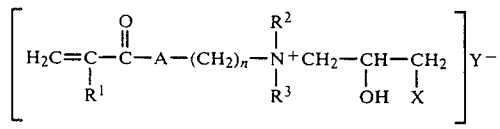

where $R^1$ is hydrogen or a methyl group; A is —O— or

with $R^4$ being hydrogen or a $C_1$–$C_3$ alkyl group; $R^2$ and $R^3$ are independently $C_1$–$C_6$ alkyl groups; X is a halogen; Y is an anion; and n is 1–4; wherein the improvement comprises polymerizing the mixture in the presence of a water-soluble cationic azo initiator and a water-soluble, substantially non-partitioning amino thiol chain transfer agent and wherein the latex is characterized by its high solids content and low viscosity and the polymer is characterized by its high molecular weight in comparison with the same polymer prepared by carrying out the polymerization in the presence of a chain transfer agent other than the water-soluble, substantially non-partitioning amino thiol salt chain transfer agent.

16. The process of claim 14, wherein from about 0.05–1% of 2,2'-azobis(2-amidino-propane) hydrochloride is used as the initiator and from about 0.01–0.2% of cysteamine hydrochloride or 2-diethylaminoethane thiol hydrochloride is used as the chain transfer agent, the percentages being by weight based on polymer solids.

17. The process of claim 16, wherein from about 0.18–0.4% of the initiator is used and wherein from about 0.002–0.12% of the cysteamine hydrochloride is used.

18. In the process of binding nonwoven materials, the improvement comprising using as the formaldehyde free binder a high solids, low viscosity, alkaline-curable, thermosetting cationic vinyl ester based polymer latex, which is prepared by polymerizing a mixture of
(a) at least about 5% of a vinyl ester having the formula

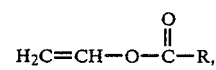

wherein R is a straight or branched chain $C_1$–$C_6$ alkyl group;
(b) about 0.1–10% of a functional cationic quaternary ammonium monomer having the formula

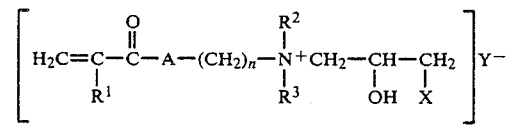

where $R^1$ is hydrogen or a methyl group; A is —O— or

with $R^4$ being hydrogen or a $C_1$–$C_3$ alkyl group; $R^2$ and $R^3$ are independently $C_1$–$C_6$ alkyl groups; X is a halogen; Y is an anion; and n is 1–4; and
(c) 0–94.9% of a vinyl polymerizable monomer; the polymerization being carried out in the presence of water, an effective amount of a water-soluble cationic azo initiator and a water-soluble, substantially non-partitioning amino thiol salt chain transfer agent, and an emulsion-stabilizing amount of a cationic or nonionic surfactant or mixtures thereof; the monomer percentages being by weight and totaling 100%; the self-crosslinking cationic polymer having a higher molecular weight than the same polymer prepared by carrying out the polymerization in the presence of a chain transfer agent other than the water-soluble, substantially non-partitioning amino thiol salt chain transfer agent.

19. The latex of claim 18 for use as a binder for nonwovens, wherein the vinyl ester is vinyl acetate or vinyl propionate; wherein the cationic monomer is the reaction product of N,N-dimethylaminopropyl methacrylamide or N,N-dimethylaminoethyl methacrylate and epichlorohydrin; and wherein the vinyl polymerizable monomer is selected from the group consisting of butyl acrylate, ethylene, acrylamide, diallyl maleate, 2-hydroxyethyl acrylate, and mixtures thereof.

20. The latex of claim 19, wherein the vinyl ester is vinyl acetate; the cationic monomer is the reaction product of N,N-dimethylaminopropyl methacrylamide and epichlorohydrin; and the vinyl polymerizable monomer is butyl acrylate or ethylene with minor amounts of acrylamide, diallyl maleate, or 2-hydroxyethyl acrylate.

* * * * *